March 10, 1964 W. G. WHITNEY 3,124,645

BINARY CODED PULSE RECORDING AND REPRODUCING APPARATUS AND SYSTEM

Filed Sept. 15, 1961 6 Sheets-Sheet 1

INVENTOR.
WILLIAM G. WHITNEY

BY George H. Fritzinger

AGENT

March 10, 1964 W. G. WHITNEY 3,124,645

BINARY CODED PULSE RECORDING AND REPRODUCING APPARATUS AND SYSTEM

Filed Sept. 15, 1961 6 Sheets-Sheet 2

INVENTOR.
WILLIAM G. WHITNEY

BY George H. Fritzinger

AGENT

INVENTOR.
WILLIAM G. WHITNEY
BY George H. Fritzinger
AGENT

March 10, 1964 W. G. WHITNEY 3,124,645
BINARY CODED PULSE RECORDING AND REPRODUCING APPARATUS AND SYSTEM
Filed Sept. 15, 1961 6 Sheets-Sheet 4

INVENTOR.
WILLIAM G. WHITNEY
BY George H. Fritzinger
AGENT

*INVENTOR.*
WILLIAM G. WHITNEY

*BY* George H. Fritzinger

AGENT

March 10, 1964 W. G. WHITNEY 3,124,645

BINARY CODED PULSE RECORDING AND REPRODUCING APPARATUS AND SYSTEM

Filed Sept. 15, 1961 6 Sheets-Sheet 6

INVENTOR.
WILLIAM G. WHITNEY
BY
George H. Fritzinger
AGENT

United States Patent Office 3,124,645
Patented Mar. 10, 1964

3,124,645
BINARY CODED PULSE RECORDING AND REPRODUCING APPARATUS AND SYSTEM

William G. Whitney, Pines Lake, N.J., assignor to McGraw-Edison Company, Elgin, Ill., a corporation of Delaware Filed Sept. 15, 1961, Ser. No. 138,332
14 Claims. (Cl. 178—17.5)

This invention relates to an apparatus and system for recording and reproducing coded signals for controlling external machines, and particularly it relates to such apparatus and system for recording and reproducing coded signals on and from a magnetic card for operating an electric typewriter.

Heretofore, it has been a common practise to use long punched paper tapes for the permanent storage of coded information for operating electric typewriters. By the present invention coded signals are stored magnetically on small flat durable magnetic cards which can be easily handled and filed compactly.

Punched tapes for operating electric typewriters have one or more punched holes along successive transverse lines or columns of the tape to represent respective characters to be typed. The number and positioning of the holes as with respect to channels lengthwise of the tape are chosen in each column to represent respective characters according to a standard binary code. A hole in a channel provides a marking signal and a no-hole represents a spacing signal. When a key with a certain character is operated at the sending machine a combination of marking and spacing signals are sent out to punch that combination in a cross line of the tape according to the standard binary code, and vice versa, when that signal combination is received a corresponding type bar is selected to print that character. The sending and receiving machines are synchronized by a start-stop system which requires the machines to be started and stopped to send out the series of signals representing each character. In operation, the punched tape is fed through a tape reader which provides a start signal prior to reading each cross column of holes followed by a stop signal. A so-called six unit binary code has up to six holes as a maximum in a column and provides sixty-four possible code combinations for representing as many as sixty-four different characters (letters, numbers, punctuation marks, etc.) and functional operations (carriage return, backspace, forward space, tabulation, lower and upper case shift, etc.).

An object of the invention is to provide a machine for recording serially the code signals of successive characters represented by the hole combinations in successive cross lines or columns of a punched tape.

Another object is to provide a machine for recording serially the code signals of successive characters along parallel tracks of a magnetic card and for playing back such recorded cards to operate electric typewriters or similar equipment.

Another object is to provide a transverse magnetic recording and reproducing machine for recording and playing back coded signals along successive transverse tracks wherein controls are operated by the recording machine to stop the feed of the coded signals thereto during each reversal in the drive of the magnetic head. Since a tape reader operates to read the punched hole or hole combinations representing successive characters in successive 100 millisecond intervals, a feature of the invention in this respect is to open the start circuit of the tape reader at least 100 milliseconds before the magnetic head is reversed in its drive.

A further object of the invention is to provide control means operable by the magnetic head prior to each reversal in its drive for muting the signal circuits of the machine during each reversal.

Further objects and features of the invention reside in the novel details of construction of the apparatus and in the novel controls of the system by which the new and improved results of the invention are obtained, and will be apparent from the following description and the appended claims.

In the description of the invention, reference is had to the accompanying drawings, of which:

Figure 1:
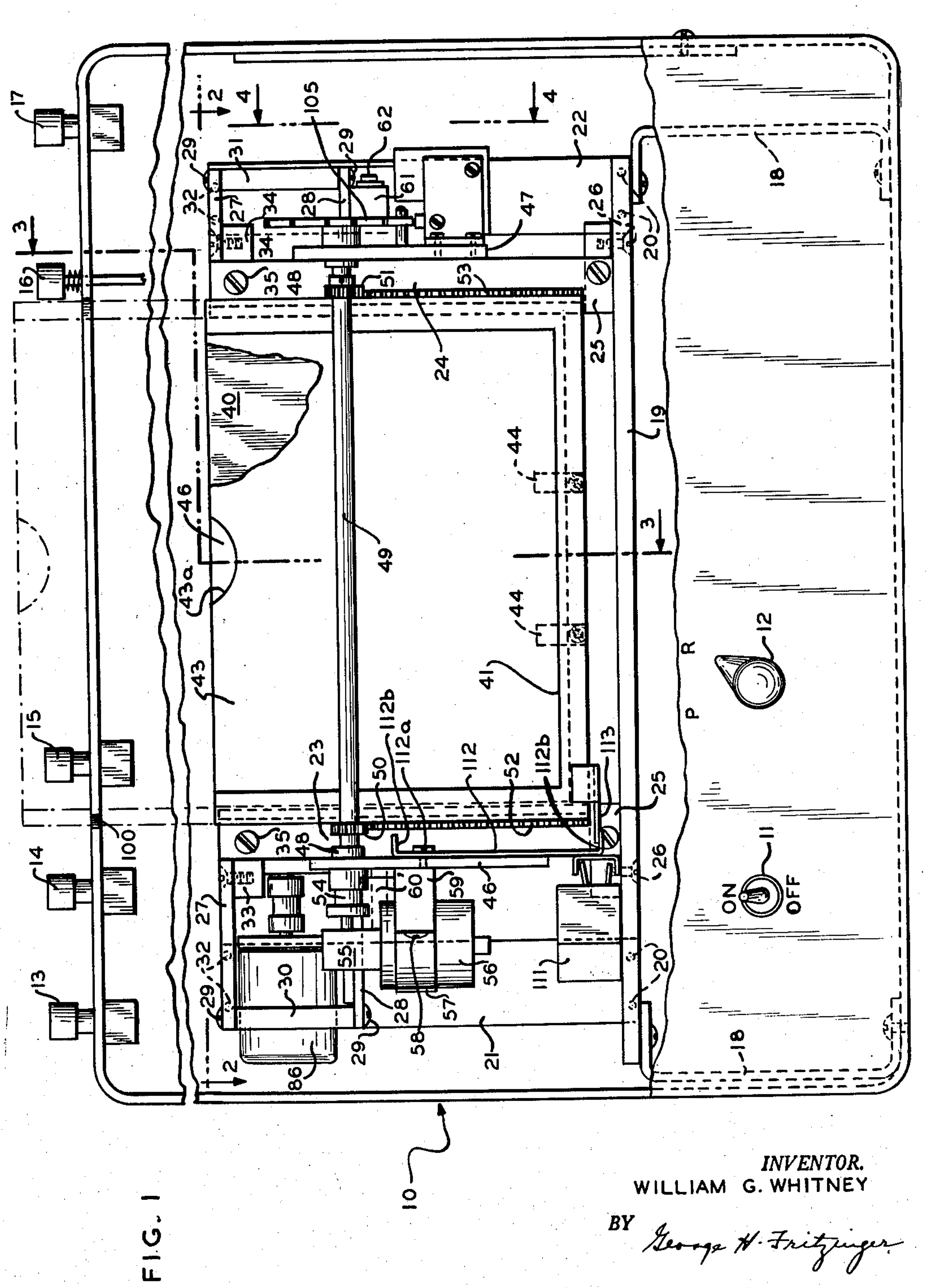
FIGURE 1 is a front elevational view with portions broken away showing a recording and reproducing machine according to the invention for recording on and reproducing from a magnetic card along successive transverse tracks thereon.

A further general description of an automatic typewriter system may be helpful before describing the details of the mechanism of the present recording and reproducing machine. When an electric typewriter is operated manually a tape punch mechanism connected thereto will advance an imperforate tape one step responsive to each key depression and will punch the combination of holes in a cross line of the tape representing the selected character. Thus, there may occur any indefinite delay between successive key depressions without forming blank space along the tape. When such punched tape is fed through a tape reader the tape is fed intermittently by successive steps with the reader providing a start signal, the coded signals representing the selected character, and a stop signal for each step advance. Since there are recorded on the punched tape not only the characters to be typed but also the functional operations which control the typewriter, the automatically controlled machine will retype the material on a sheet in the same spatial arrangement in which it was originally typed by the sending machine when the tape was punched.

The advantage of recording by the present apparatus on a magnetic card from a tape reader instead of from the impulses sent out by the sending machine when the tape was punched is that the tape can be fed continuously through the reader and the present magnetic recording machine can be operated therefore also continuously without need for any quick start-stop control apparatus.

As will appear the present apparatus may be used in connection with either a Flexowriter or a Teletypewriter, or other electric writing machines of similar character. A tape reader for a Teletypewriter scans from left to right the successive cross lines in successive 100 millisecond intervals and produces a start pulse followed by one or more signal pulses on a time basis in accordance with the spacing of the holes in each cross line. The start pulse has a duration of approximately 13 milliseconds, and the signal pulses comprising both marking and spacing signals occur in approximately 13 millisecond intervals, leaving approximately 19 milliseconds interval for a stop signal at the end of each cross reading of the tape when a five unit binary code is employed. The start pulse followed by the code signals and then by the stop pulse are fed into a signal line to the magnetic head and recorded serially as the head is driven back and forth along successive tracks on the magnetic face of the card. On the other hand, a tape reader for a Flexowriter reads simultaneously all the punched holes in a cross line of the tape and produces first a start pulse followed by the code signals as a group and then by a stop pulse with each signal or pulse being fed into a separate line to the Flexowriter. The code signal circuits are connected to respective relays of a so-called relay tree to engage a selected cam unit of the Flexowriter with the power roll and impart a driving impulse to the type bar bearing the selected character. Since the present machine operates to record serially the coded signals representing the respective characters to be typed, the coded information from a Flexowriter must be fed through a conversion unit to transfer the coded signals from parallel to series arrangement during recording and is again fed through a conversion unit to transfer it from series to parallel arrangement during reproducing. The conversion unit for this purpose is a well-known standard apparatus and need not be described in detail for purposes of the present invention.

It may be noted that a tape reader has a one-revolution clutch which is driven one revolution during a 100 millisecond interval to scan a cross column of the tape. The clutch is controlled by a start magnet. When the circuit of the start magnet receives a start pulse it starts a one-revolution engagement of the clutch to read a cross column of the tape. When the start circuit is broken it allows completion of the reading of the column then underway but does not permit the reading of a successive column until the start circuit is again closed. Since a tape reader feeds out start and stop pulses in connection with each combination of coded signals representing a respective character to be typed, such start and stop signals together with the coded signals are recorded by the present machine. During playback of the magnetic card machine each start signal will start a one-revolution clutch of the electric typewriter to drive the type bar selected according to the coded signals and to disengage the clutch after each selected character is typed.

The magnetic card recording and reproducing machine shown in FIGURES 1 to 5 has a housing 10 which is rectangular as viewed from the top and sides. Extending through apertures in the front wall is an on-off control 11 and a record-playback control 12, and extending upwardly through apertures in the top wall are five push button controls which from left to right are a stop control 13, a card eject control 14, a card load control 15, a head lift control 16 and a start control 17. Each of the top controls is in the form of a push button.

Supported from the bottom wall of the housing through two front-to-back extending U brackets 18 is a heavy horizontal base plate 19 of rectangular shape extending nearly the full width and depth of the housing. Secured by screws 20 to the back edge of the base plate are two upstanding bar-shaped frame members 21 and 22 one of which is set inwardly from the left side of the base plate and the other of which is flush with the right edge of the base plate. Positioned about one-third the thickness of the housing from the front wall thereof and set inwardly from the side walls thereof are two upright columns 23 and 24. These columns are substantially rectangular in horizontal section but have vertical rails designated by the numbers of the columns with the suffix letter *a* extending from the inner sides of the columns towards each other. Each column is secured to a block 25 at its lower end which in turn is secured by screws 26 to the base plate 13.

Figure 2:
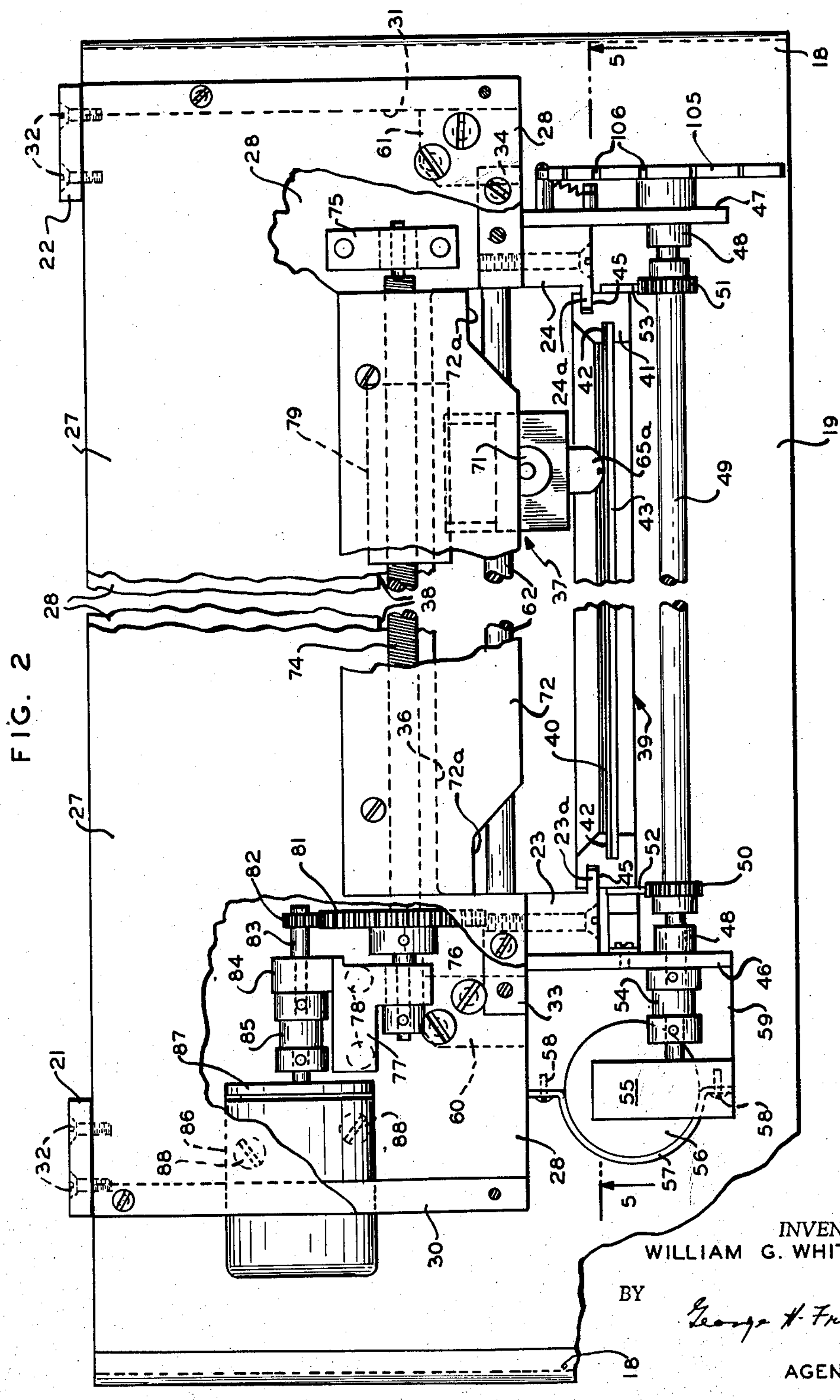
FIGURE 2 is a fractional horizontal sectional view taken on the line 2—2 of FIGURE 1.

The frame members 21 and 22 and the columns 23 and 24 support a top frame plate 27 and an intermediate frame plate 28 all in parallel relation to each other. The top and intermediate frame plates are joined together at their side edges through screws 29 to end walls 30 and 31. The top plate 27 is secured at its back edge by screws 32 to the frame members 21 and 22, and is secured also to the columns 23 and 24 through blocks 33 and 34 secured by screws to the top plate and in turn secured by screws 35 to the back sides of the columns. The top plate 27 is rectangular except for a deep rectangular notch 36 in its front edge to provide clearance for a laterally movable head carriage 37. Likewise the intermediate plate 28 is rectangular except for a still deeper rectangular notch 38 in its front edge provided also for clearing the carriage as shown in FIGURE 2.

Between the columns 23 and 24 there is a holder 39 for a card 40 faced on its back side with magnetizable material to form a record medium. The holder 39 comprises a U-shaped frame 41 positioned upright and opened to the top of the machine. The frame 41 has slots 42 in the inside edges of the two side members thereof which receive a panel 43 forming a backing plate for the card 40. The slots 42 are wider than the thickness of the backing plate and the backing plate is held against the forward edges of the slots as by welding so as to provide open vertical slots in the side frame members directly behind the panel to receive the side edges of the card 40 as the card is slid downwardly into the side frame members. Spring clips 44 shown in FIGURES 1 and 3 serve to hold the card releasably in place when the card is fully inserted into the holder. In the side members of the frame 41 are outer slots 45 receiving slidably the vertical rails 23*a* and 24*a* formed on the columns 23 and 24. This sliding engagement of the frame 41 with the rails provides the card holder with a vertical freedom of movement. Secured to the outer walls of the columns 23 and 24 are forwardly extending frame plates 46 and 47 which carry bearings 48 for a shaft 49 extending transversely of the machine. Secured to this shaft in positions adjacent to the inner ends of the bearings 48 are pinions 50 and 51 which engage respective vertical racks 52 and 53 secured to the side members of the card holder frame 41. Thus, by turning the shaft 49 the card holder can be shifted vertically between the vertical columns 23 and 24.

The shaft 49 is connected at its left end through a flexible coupling 54 and gear box 55 to a reversible scan motor 56. This is a small cylindrical motor mounted vertically by a strap 57 clamped by screws 58 to a mounting bracket 59 which extends laterally from the left frame plate 46.

Figure 3:
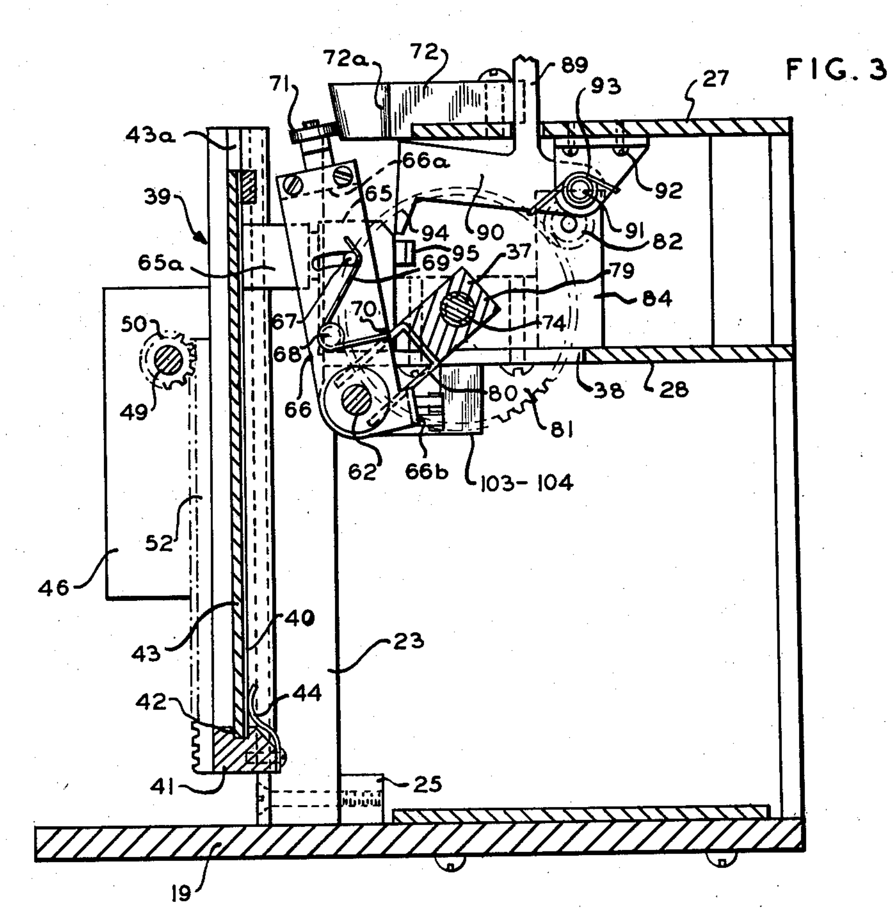
FIGURE 3 is a vertical left-hand sectional view taken on the line 3—3 of FIGURE 1.
Figure 4:
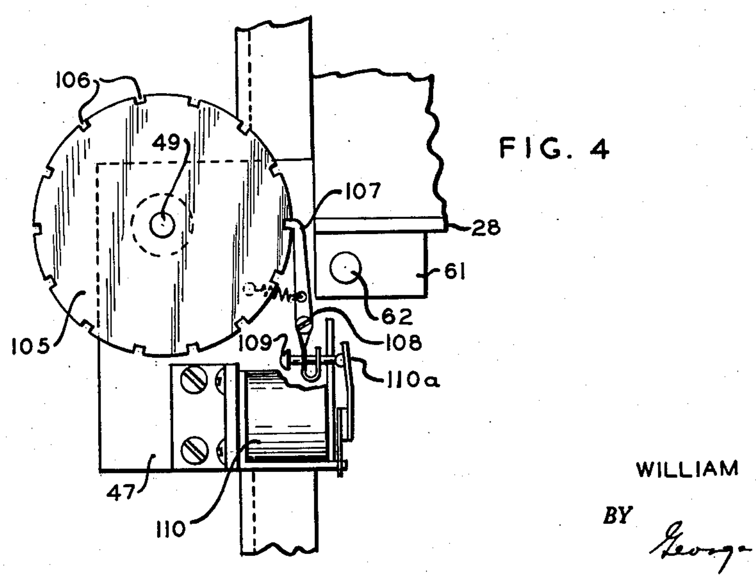
FIGURE 4 is a fractional elevational view taken on the line 4—4 of FIGURE 1.
Figures 5, 6:
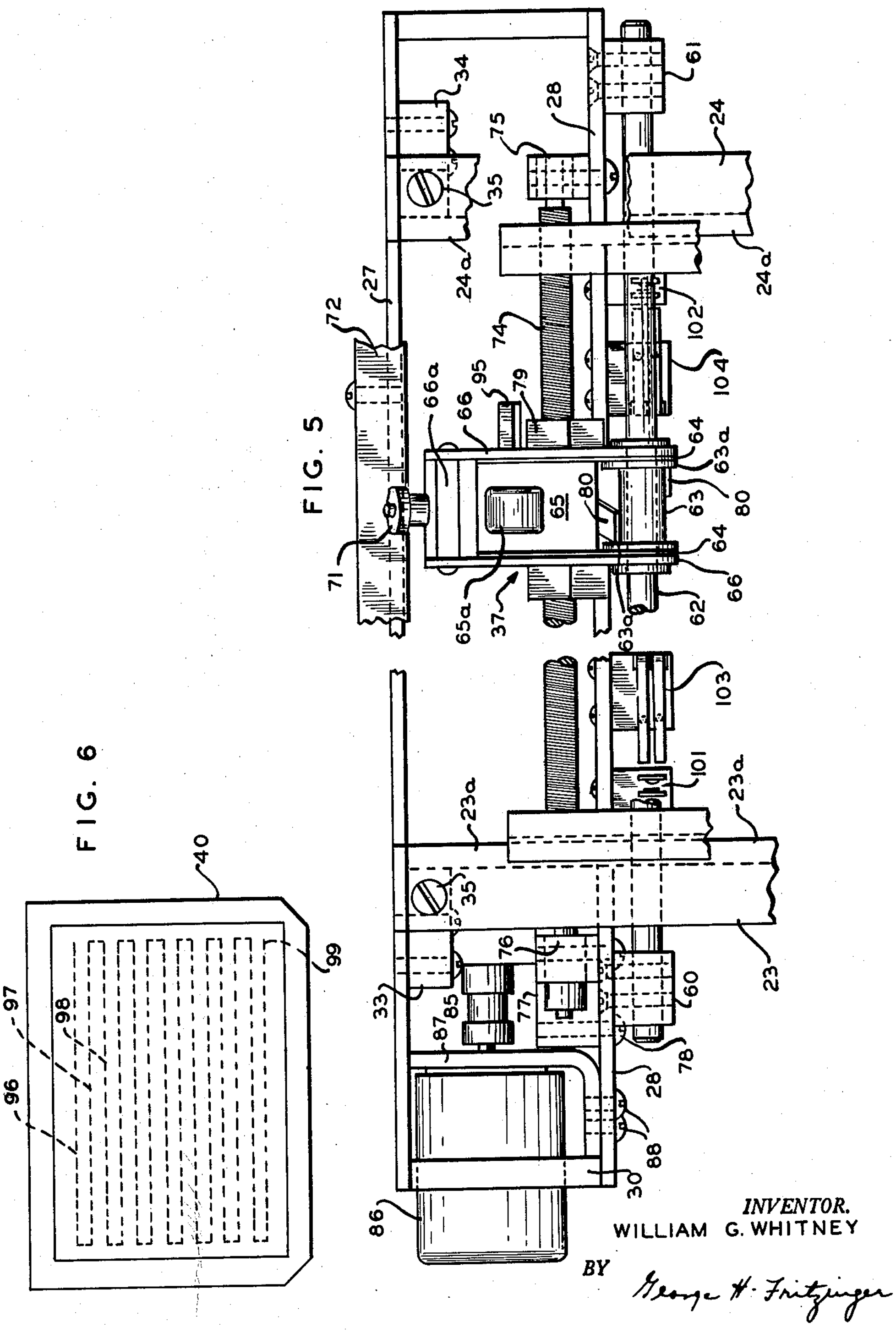
FIGURE 5 is a vertical sectional view taken on the line 5—5 of FIGURE 2.
FIGURE 6 is a view of a magnetic card record for the present machine showing tracks thereon by dotted lines.

Secured to the underside of the intermediate frame plate 28 in positions laterally beyond the columns 23 and 24 are blocks 60 and 61 (FIGURES 1, 4 and 5). These blocks are apertured in directions laterally of the machine to receive the ends of a support rod 62 on which the head carriage 37 is slidably mounted for movement transversely of the magnetic card 40. As shown in FIGURE 5, a bearing 63 with flanges 63*a* inset from the ends thereof is mounted slidably and rotatably on the support rod 62. Pivoted on the bearing against the flanges 63*a* are two side arms 64 which are support arms for a recording and reproducing head 65 having pole pieces 65a projecting forwardly into engagement with the magnetic card 40. Straddling the head 65 is an inverted U-shaped rocker 66 having side members secured at their lower ends to the bearing 63. The right support arm 64 for the head 65 has a side pin 67 extending through a clearance slot in one side of the rocker 66 (FIGURE 3). Located on a stud pin 68 on this same side of the rock is a torsion spring 69 having one tail bearing against the side pin 67 and the other against a lug 70 on the rocker to urge the head 65 counterclockwise relative to the rocker about the support rod 62 as a center. Journaled to the upper end of the rocker 66 is a roller 71 which rides against a cam plate 72 on the top frame plate 27 under pressure of the torsion spring 69. The front face of this cam plate engaged by the roller 71 is parallel with the support rod 62 except for deep notches 72a at the ends of travel of the carriage. This cam plate holds the rocker in an angular position to cause the torsion spring 69 to press the head 65 against the card 40 with suitable pressure throughout the central useful recording and reproducing range of the head but releases the head pressure from the card in each end zone while the drive of the head is reversed.

Positioned rearwardly and upwardly from the carriage support rod 62 in parallel relation thereto is a feed screw 74. This feed screw is journaled at its right end in a bearing 75 secured to the top side of the intermediate frame plate 28 (FIGURE 2) and extends at its left end through a bearing 76 carried by a block 77 secured by screws 78 also to the top side of the intermediate frame plate 28. Threaded onto this feed screw is a block-shaped feed nut 79 preferably of plastic such as that known commercially as Delrin. Secured to the feed nut is a U-shaped member 80 having upper and lower arms which straddle the central portion of the bearing 63 (FIGURES 3 and 5) with only slight play between the flanges 63a so as to couple the feed nut to the carriage for the head 65.

The feed screw 74 has a large gear 81 secured to the left end portion thereof which meshes with a pinion drive gear 82 fixed on a shaft 83 journaled in a bearing 84 also carried by the block 77. The shaft 83 is connected through a flexible coupling 85 to the shaft of a reversible drive motor 86 mounted on an L bracket 87 secured by screws 88 (FIGURE 5) to the intermediate frame plate 28 in a position wherein the outer end portion of the motor extends horizontally through an aperture in the end wall 30.

When the head carriage 37 is in its home position at its right end of travel crosswise of the magnetic card holder, the head can be shifted away from the card holder to clear a path for inserting the magnetic card 40 by depressing the head shift button 16. This button is mounted on an upstanding arm 89 of a lever 90 pivoted at 91 to a bracket 92 depending from the top plate 27 as shown in FIGURE 3. The lever is biased upwardly against the underside of the top plate 27 as a stop by means of a torsion spring 93 between the lever and bracket 92. As the button 16 is pressed downwardly a depending cam finger 94 on the free end of the lever 90 engages a transverse arm 95 secured to but spaced rearwardly from the backside of the head 65 to shift the head rearwardly from the car 40 about the support rod 62 as a center.

The present machine starts recording on or reproducing from a newly mounted card when the card holder is in its downmost position shown in FIGURE 1 and the head 65 is in its rightward or home position engaging the upper right-hand corner of the card. The head 65 is first driven to the left across the card while the card holder remains stationary to describe the first track 96 shown in FIGURE 6. When the head reaches the left side of the card, the card holder is stepped upwardly by one interval and concurrently the direction of drive of the head is reversed causing the head then to be moved to the right to describe the second track 97. Likewise, when the head reaches the right side of the card the card holder is stepped upwardly another interval and the drive of the head is again reversed, causing the head next to describe the track 98, etc. If the card is recorded on to the end 99 of the last track the card holder will be in a fully raised position projecting about one-fourth of its height through an opening 100 in the top of the housing 10 as indicated by dash-dot lines in FIGURE 1.

The means for reversing the drive of the head and for concurrently stepping the card upwardly by an interval is controlled by end switches 101a and 101b at the left side of the card holder and by a pair of corresponding ends switches 102a and 102b at the right side of the holder. These end switches are mounted on the under side of the intermediate frame plate 28 in line with the travel of the carriage for operation by abutment of the carriage thereagainst as the carriage reaches the ends of its travel. (FIGURE 5.) Further, as the carriage nears the left end of travel a cross lug 66b at the back of the support rod 62 is moved slidably against a pair of intermediate end switches 103a and 103b in sequence as shown in FIGURE 3 to open first a start circuit S of a tape reader and 100 milliseconds later to mute the record-playback amplifier A during each reversal of the drive and advance of the card holder. Similarly, as the carriage nears the end of its rightward travel it operates a pair of corresponding intermediate end switches 104a and 104b. The intermediate end switches are mounted on the under side of the intermediate frame plate 28 directly behind the path of the carriage.

The means for measuring each step advance of the card holder comprises a wheel 105 secured to the right end of the shaft 49 and provided with a series of equally spaced peripheral notches 106. Engaging this notched wheel is a pawl 107 pivoted at 108 (FIGURE 4) and coupled via an adjusting screw 109 to the armature of an electromagnet 110 bracketed to the right frame plate 47 (FIGURE 1). As will appear, the relay 110 is activated momentarily by operation of each end switch to start the scan motor 56 and the motor is then held in by the pawl 107 riding on the periphery of the wheel 105 and operating a switch 110a until the pawl engages the next succeeding notch 106 to open the motor circuit and latch the wheel. The direction of drive of the scan motor is determined by a double pole motor reversing switch 111 mounted on the base 19 at the left side of the card holder (FIGURE 1). Connected to the pole members of this reversing switch is a slide 112 secured by screw slot means 112a to the frame plate 46 and having a turned over lug 112b at each end positioned for engagement by a side finger 113 on the card holder as the card holder moves into its upper and lower end positions. The slide is biased over center by spring means (not shown) in switch 111 so that the reversing switch is retained into which ever position it is moved until it is shifted to its other position.

Figure 7:
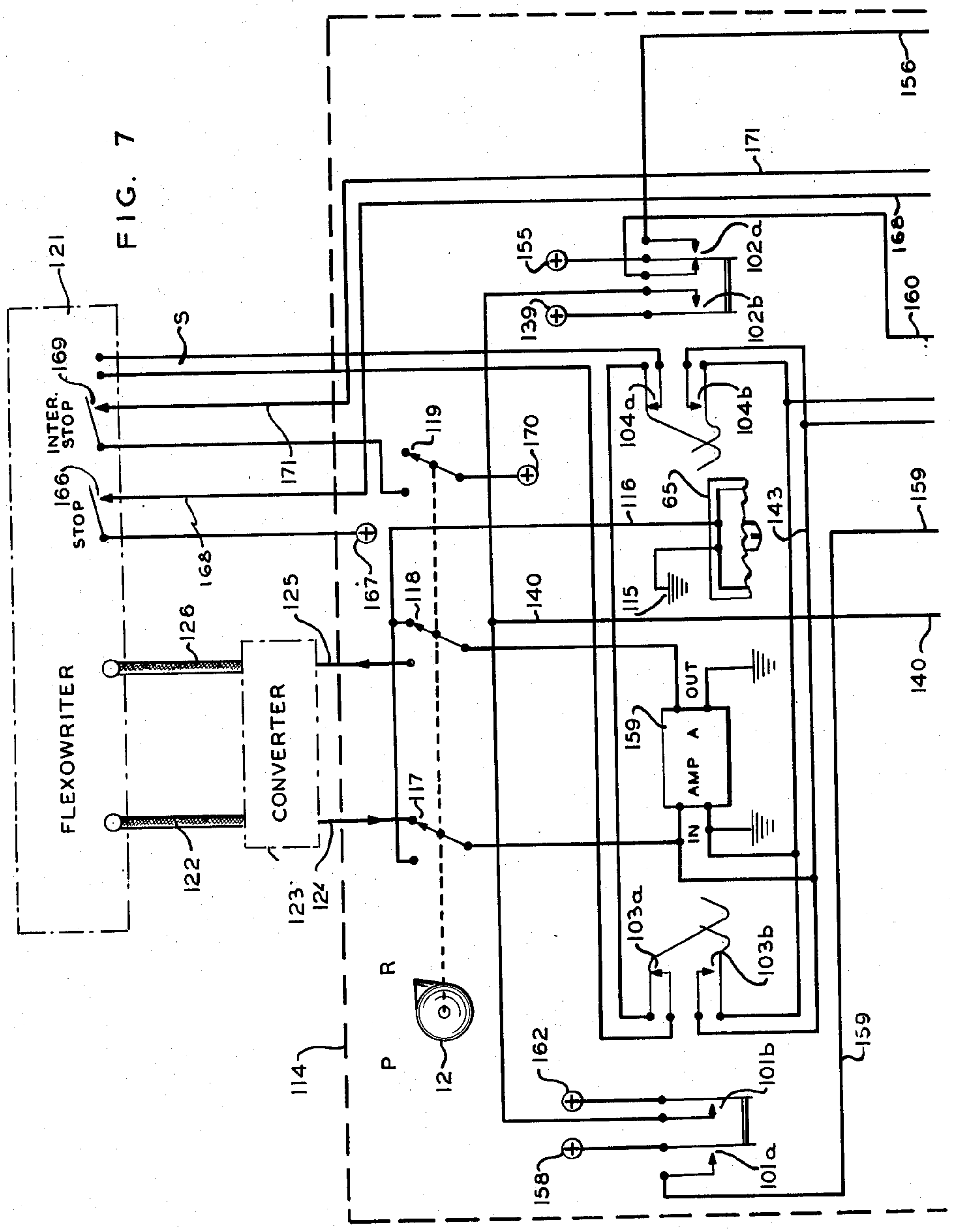
FIGURES 7 and 7*a* taken together constitute a schematic circuit diagram of the present apparatus and system for recording coded signals on and for reproducing the same from a magnetic card to operate an electric typewriter.
Figure 7A:
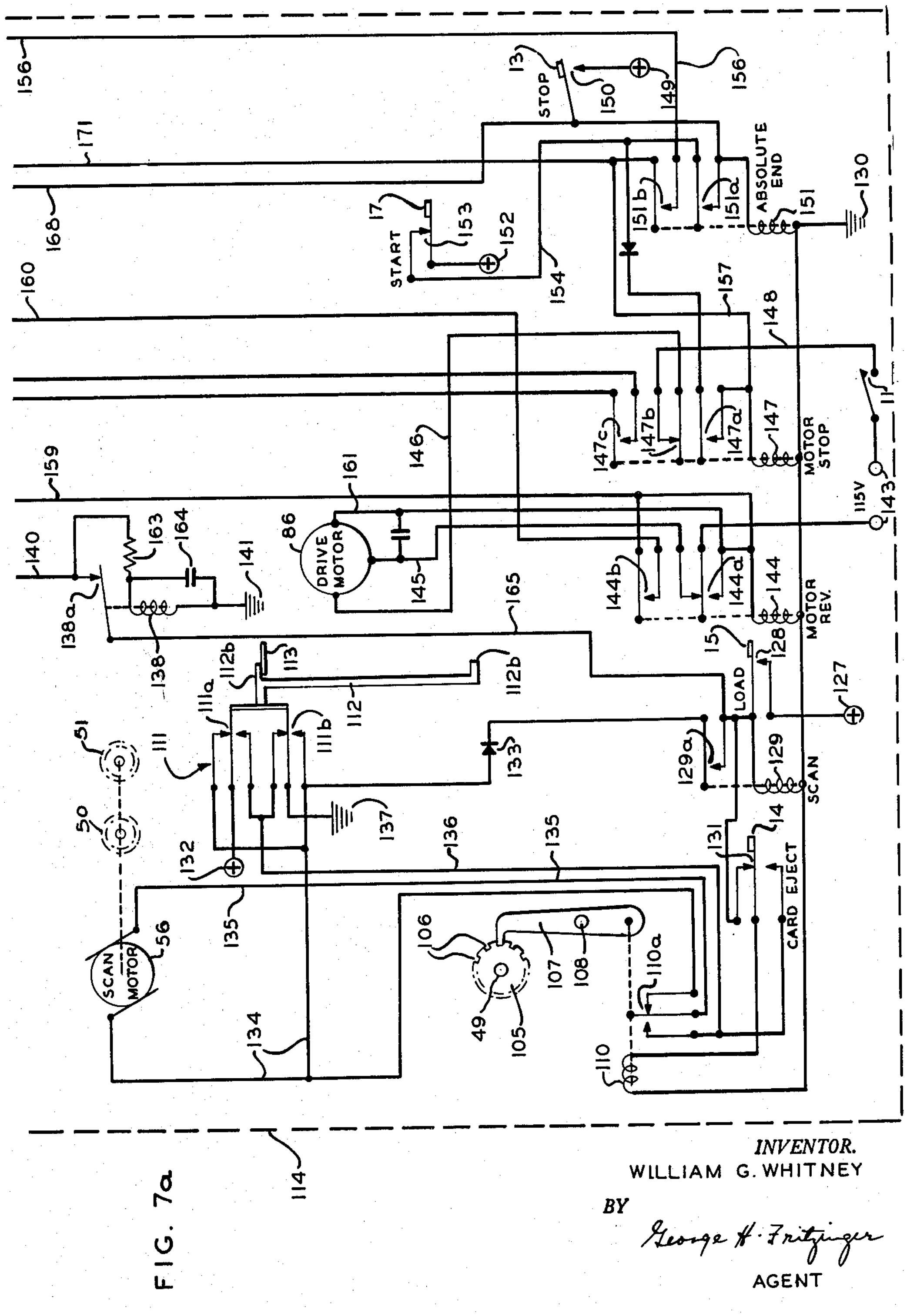

The operation of the present system is herein next described with reference to the schematic circuit diagram shown in FIGURE 7 wherein the dash-dot enclosure 114 represents the entire card recording and playback machine hereinbefore described. The signal circuits for this machine comprise a ground connection 115 for one terminal of the head 65 and a lead wire 116 for the other terminal connected to one terminal of the record-playback switch 12. This switch has three poles 117, 118, 119 mechanically interconnected for simultaneous operation. The first two of these switches are used for interchanging the connections to the amplifier A between record and reproduce conditions. Thus, when this switch is in record position shown in FIGURE 7 the output of a Flexowriter 121 is connected via a cable 122 to a conversion unit 123 and the output of this conversion unit is connected via lead 124 and the switch pole 117 to the input of the amplifier A. At the same time, the output of the amplifier is connected by switch pole 118 to the head 65 operating as a recorder. When the switch 12 is in playback position the head 65 now operating as a reproducer is connected by the switch pole 117 to the input of the amplifier and the output of the amplifier is connected by switch pole 118, lead wire 125, conversion unit 123 and cable 126 to the input of the Flexowriter. As before explained, the function of the conversion unit is to convert from parallel circuit input to single circuit series signal output during recording and from single circuit series signal input to parallel circuit output during playback. If a Teletypewriter is used in place of the Flexowriter the conversion unit is not needed.

After the operator has inserted a magnetic card 40 in the card holder while the latter is in its raised position shown by dash-dot lines in FIGURE 1, he presses the load button 15. This provides power from plus terminal 127 through load switch 128 to both a scan relay 129 and an eject switch 131 upper contact and centralizing relay 110 to ground 130. Actuation of the scan relay 129 closes a switch 129*a* to provide a hold circuit for the relay from plus terminal 132 through the reversing switch 111*a* upper contact and through rectifier 133, scan switch 129*a* and relay 129 to ground 130. It is in this connection to be noted that the reversing switch 111 is at first in the position shown in FIGURE 7 by reason of the finger 113 of the card holder bearing upwardly against the upper lug of the slide 112. Actuation of the centralizer relay 110 closes the switch 110*a* at its left contact to complete a circuit for the scan motor 56 from plus terminal 132 through reversing switch 111*a* upper contact, lead 134, motor 56, lead 135, switch 110*a* left contact, lead 136, reversing switch 111*b* upper contact and ground 137. This is the direction of current for the scan motor to cause it to drive the card holder downwardly. Since the centralizing relay 110 is now energized continuously by reason of the scan or load relay 129 now being held in through contacts 129*a*, the pawl 107 is held disengaged from the notched wheel 105 and the card holder is driven downwardly until the finger 113 abuts against the lower lug 112*b* of the slide 112 and thus throws the reversing switch 111 over center into its lower position. This shift in the reversing switch reverses the current flow through the scan motor 56 from the plus terminal 132 through the switch 110*a* left contact to ground 137, but at the same time it breaks the hold circuit for the load relay 129 to drop out this relay and to open the switch 129*a* which in turn breaks the supply circuit for the centralizer relay 110. The resultant drop out of the centralizing relay 110 opens the switch 110*a* at its left contact to break the power supply circuit for the scan motor 56 and closes the switch 110*a* at its right contact to provide a short across the scanned motor whereby to brake the motor quickly to a standstill and release the pawl 107 to engage the next notch in the wheel 105.

During the downward loading movement of the card holder the head 65 remains at its right end position holding switch 104*a* open and 104*b* closed and holding the end switches 102*a* and 102*b* in their rightward positions. Operating current is now supplied to a pulsing relay 138 from plus terminal 139 through switch 102*b*, lead 140, relay 138 and ground 141. The relay 138 is therefore now operated to hold its contact 138*a* open. This contact is in a power supply circuit for the scan relay 129 and centralizer relay 110. Switch 104*a* is connected in the start circuit S of the Flexowriter and being now open prevents the tape reader from operating. Switch 104*b* is connected across the input of the amplifier A through leads 143 and being closed now mutes the amplifier. Thus, the machine is in an inoperative condition as the card holder is moved downwardly into its load position.

The foregoing shifting of the card holder to its load position responsive to pressing the load button 15 is not dependent upon the A.C. power supplied to the machine through the power terminals 143 and on-off switch 11. If the head had been driven to its home position and there stopped by pressing the stop button an absolute end relay 151 would stand operated from the A.C. power supply and the start button 17 would have to be pressed to start the machine running, as will appear. On the other hand, if the machine was loaded with the on-off switch in "off" position and this switch is next thrown to "on" position the drive motor 86 for the head would be started by a circuit running from left terminal 143 of the power supply through switch 144*a* upper contact of a drive motor reversing relay 144, lead 145, motor 86, common return lead 146, switch 147*b* of a motor stop relay 147, lead 148 and the on-off switch 11 to the other power terminal 143. The operator would have to press immediately the stop button 13 after throwing the on-off switch to "on" position in order to stop the motor drive. Upon pressing the stop button 13 current is supplied from plus terminal 149 through stop switch 150 to an absolute end relay 151 via the ground 130. The instant the absolute end relay is operated it receives a hold circuit from plus terminal 152, start switch 153, lead 154 and switch 151*a* of the absolute end relay. Activation of the absolute end relay closes a second switch 151*b* to operate the motor stop relay 147 from plus terminal 155 through end switch 102*a* right contact, lead 156, switch 151*b*, lead 157, motor stop relay 147 and ground 130. Operation of the motor stop relay opens switch 147*b* to break the power supply circuit for the motor 86.

If the head 65 is not in an end position holding end switch 102*a* closed with its right contact at the instant the stop button is pressed the motor 86 will drive the head carriage through the cycle from home position until it reaches again its right end position closing the switch 102*a* at its right contact and thereby operating the motor stop relay to stop the drive motor 86.

Upon pressing the start button 17 the switch 153 is opened to drop out the absolute end relay 151. This in turn drops out the motor stop relay 147 and completes the common lead circuit 146 to start the drive motor 86. If the head carriage is at its right end of travel the motor reversing relay 144 is not operated and will cause the motor to be driven in a direction to move the head carriage to the left. As the head carriage moves from its rightward position the end switches 102*a* and 102*b* are released without any immediate effect and next the intermediate end switch 104*b* is opened to remove the mute from the amplifier A and the switch 104*a* is closed to restart the tape reader. As the head continues to be driven across the card 40 it receives the code signals from the tape reader and records the same on the magnetic card as pulses. As the head nears the left end of its travel it first opens the switch 103*a* to limit the tape reader to completion of the cycle then underway—which it will do within about 100 milliseconds as before explained—and then cause the reader to stop. Approximately 100 milliseconds after the reader start circuit is opened the switch 103*b* is closed to mute the amplifier A. The head then continues onward to the left and immediately operates the end switches 101*a* and 101*b*. The closing of the switch 101*a* supplies current from the plus terminal 158 through switch 101*a*, lead 159 and motor reversing relay 144 to ground 130 thereby shifting the direction of drive of the head. The instant to motor reversing relay 144 is operated it receives a hold circuit from plus terminal 155 through right end switch 102*a* left contact, lead 160, switch 144*b*, motor reversing relay 144 and ground 130. The reversing action of the relay is by switch 144*a* moving to its lower contact and shifting connection of the A.C. power supply 143 from lead 145 to a lead 161 of the motor 86.

At the same instant that the drive motor 86 is reversed the closure of the end switch 101*b* connects plus terminal 162 through switch 101*b* and lead 140 through pulsing relay 138 to ground 141. Operation of the pulsing relay 138 is delayed for an instant by a series resistor 163 and a shunt condenser 164. During this instant power is supplied from plus terminal 162 through switch 138*a* of the pulsing relay, and lead 165 to the load relay 129 and through the eject switch 131 to the centralizing relay 110 to ground 130. The load relay is operated only for the duration of the pulse without effect because it does not now receive holding current since the scan reversing switch 111 is in a down position breaking the hold circuit for the load relay. The momentary engagement of the centralizing relay 110 however disengages the pawl 107 and closes the switch 110*a* at its left contact to start the scan motor 56. The circuit for the scan motor 56 now runs from plus terminal 132 through switch 111*a* lower contact, lead 136, switch 110*a* left contact, lead 135, motor 56, lead 134, switch 111*b* lower contact and ground 137. This provides a direction of current flow through the scan motor 56 to cause the motor to drive the card holder upwardly. As soon as the motor has so driven the card holder one interval, the pawl 107 drops into the next notch 106 opening the switch 110a at its left contact and breaking the circuit for the scan motor. The card holder is therefore stopped and held stationary by the pawl 107 engaging the notched wheel 105 while the head 65 is driven to the right along the second track 97. As the head starts to the right end switches 101a and 101b are opened. The opening of end switch 101a is without effect since the motor reversing relay 144 is now held operated by hold circuit through the end switch at the right end of travel of the head. The opening of the end switch 101b merely drops out the pulse relay 138 without effect. As the head continues to the right the intermediate end switch 103b is opened to remove the mute from the amplifier A and 100 milliseconds later the intermediate end switch 103a is closed to restart the tape reader. The head then receives and records the code signals as it moves to the right across the card 40. As the head nears its right end of travel the sequence of operations abovedescribed are repeated: (1) the tape reader start circuit S is opened, (2) the amplifier A is muted and (3) the end switches 102a and 102b are operated. The opening of switch 102a at its left contact drops out the motor reversing relay 144 to reverse the drive motor 86 and the closing of switch 102a at its right contact makes power available to stop the machine provided the stop button 13 had been pressed during the cycle of movement of the head from home position. The closing of the switch 102b provides current to the pulse relay 138 and provides a pulse of current through switch 138a to the centralizing relay 110 again to operate the scan motor 56 to advance the card holder by one step as beforedescribed. Thus, the machine continues to record to the left and to the right along successive tracks on the magnetic card 40.

It is to be noted that at any instant when the motor stop relay 147 is activated to open the common lead 146 of the drive motor 86, the switch contacts 147c of this relay are closed to provide a short across the amplifier input and thereby mute the amplifier while the machine is at standstill.

If the stop button 13 is pressed while the head is in its right end position the machine will stop immediately but if the head is out of its right or home position when the stop button is pressed the machine will not stop until the head next reaches home position. The machine can be so stopped not only by pressing the manual stop button 13 but also by operation of a stop switch 166 in the Flexowriter connected to a plus terminal 167 in the card machine through lead wire 168 in parallel with the manual stop switch 150. The stop switch 166 in the Flexowriter is closed responsive to the code signal set up in the Flexowriter when a stop key is pressed or by the tape reader when those code signals are later read out.

During playback, any intermediate stop signal received by the Flexowriter will close an intermediate stop switch 169. This intermediate stop switch is connected in a circuit from plus terminal 170 via pole 119 of the record-playback switch 12 when this switch is in playback position, switch 169, lead 171 and lead 157 to the motor stop relay 147. During recording of a typewritten sheet the operator will press an intermediate stop key whenever a point is reached wherein individually-typed material is to be inserted. However, the intermediate stop circuit is then disabled by the switch 119 so as to have no control effect on the magnetic card machine. When the punched tape bearing such typed material is fed through the tape reader, the receipt of an intermediate stop signal will close the intermediate stop switch 169 of the Flexowriter to activate the motor stop relay 147 from the plus terminal 170 and to stop the magnetic card machine immediately since power to the motor stop relay is now direct instead of being dependent upon the absolute end relay 151 as when the stop button is pressed. After the typist has filled in the individual material following the stopping of the magnetic card machine by the intermediate stop switch, she will press the start button 17 to cause the magnetic card machine to resume playback.

After the magnetic card 40 has been completely played back the typist will press the stop button 13 to cause the machine to stop the instant the head next reaches home position. Next the typist will press the eject button 14 and hold it down. The instant the eject button 14 is pressed, power is supplied to the centralizing relay 110 from plus terminal 132 through switch 111a lower contact, lead 136, eject switch 131 lower contact, centralizing relay 110 and ground 130. Operation of the centralizing relay disengages the pawl 107 and closes the switch 110a at its left contact. The scan motor 56 is therefore now energized from plus terminal 132 to switch 111a lower contact, switch 110a left contact, lead 135, motor 56, lead 134, switch 111b lower contact and ground 137. This is direction of current for driving the card holder upwardly. When the card holder reaches its uppermost position the scan reversing switch is thrown to the position shown in FIGURE 7. This breaks the switch 111a at its lower contact to remove power from the centralizing relay. As this relay drops out it opens the switch 110a at its left contact to stop the scan motor 56 and it releases the pawl 107 to engage the next notch of the wheel 105. The card holder is therefore now in a raised position enabling the card 40 to be gripped between the fingers of the hand through a notch 43a in the upper edge of the panel 43 and to be drawn from the holder.

The embodiment of my invention hereinabove described is intended to be illustrative and not necessarily limitative of my invention since the same is subject to changes and modifications without departure from the scope of my invention, which I endeavor to express according to the following claims.

I claim:

1. A system for recording binary coded pulses to be used for operating automatically an electric typewriter, comprising a record medium having a recordable surface, a transversal recording machine having a recording head and means for driving said head back and forth across said medium while advancing the medium by one step during each reversal in the drive of said head whereby the head is moved back and forth along successive parallel transverse tracks on the record medium, means for feeding electric pulses to said head representing the coded signals for respective characters to be typed and for functional operations in controlling the automatic typewriter, said feeding means having a start circuit required to be activated before the transmission of the coded pulses representing each character and operational function, and switch means connected in said start circuit and operable by said head as it nears each end of its travel to open said start circuit and cause said feeding means to be in a stopped condition during each reversal in the drive of said head.

2. The system set forth in claim 1 wherein said feeding means is operated for a predetermined interval following each opening of said start circuit, including switch means operable by said head at least by a delay following the opening of said start circuit equal to said predetermined interval for muting the signal circuit to said head.

3. A system for recording binary coded electric pulses represented by punched holes in a tape used for operating automatically an electric typewriter, comprising a record medium having a recordable surface, a transversal recording machine having a recording head and means for driving said head back and forth across said medium while advancing the medium by one step during each reversal in the drive of the head whereby the head is moved back and forth along successive parallel transverse tracks on the record medium, a tape reader for feeding electric pulses to said head in accordance with the punched holes in said tape, said tape reader having a start circuit required to be activated before the transmission of the pulses representing each character to be typed and each functional control operation over the automatic typewriter, and switch means connected in said start circuit and operable by said head as it nears each end of its travel to open the start circuit and cause the tape reader to come to a stopped condition before each reversal in the drive of said head.

4. The system set forth in claim 3 wherein said punched tape has successive transverse columns each including one or more punched holes in a selected special arrangement to represent the coded signals for a character to be typed or for a control functional operation over the automatic typewriter, and said tape reader includes means for effectively scanning each column from one side of the tape to the other and feeding a series of electric pulses on a time basis in accordance with the spacing of the punched holes in each column of the tape, said reader being set to scan each column of the punched tape during a preset time interval, and said switch means being set to be operated by movement of said head at least by more than said preset interval prior to each reversal in the drive of the head.

5. The system set forth in claim 3 wherein said record medium comprises a semi-flexible rectangular card having a magnetic coating on one face thereof, and wherein said recording machine has a magnetic recording head cooperable with said magnetic surface, including a card holder shiftable in directions transverse to the direction of drive of said head.

6. The system set forth in claim 5 wherein said recording machine includes a card holder including a backing plate and means for holding the card releasably against said backing plate, including feed screw means for driving the head crosswise of the mounted card and rack pinion means along each side of the card holder for shifting the holder by steps in directions transverse to said feed screw means.

7. The system set forth in claim 5 including a card holder, means for driving said head crosswise of a mounted card on said holder, means for shifting the card holder in directions transverse to the direction of drive of said head, said shifting means being operable in one direction to move said mounted card into a load position and in the other direction into an eject position, and eject control means for said card holder operable to cause said card holder to be moved in the direction to place said mounted card in said eject position.

8. A system for recording and reproducing binary coded signals used for operating automatically an electric typewriter comprising a record-reproducing machine having a head reciprocable back and forth for recording and reproducing transversely of a card medium along successive parallel tracks thereon, a holder for said card medium shiftable transversely of the direction of drive of said head, rotatable means operable to shift said holder, and means for driving said rotatable means by a given distance during each reversal in the drive of said head including a scan motor connected to said rotatable means, a notched wheel on said rotatable means, a pawl for engaging said notched wheel, a centralizing electromagnet for disengaging said pawl when the electromagnet is energized, and switch means including timing means for feeding a starting pulse to said centralizing electromagnet each time said head reaches an end limit in its travel, switch means responsive to disengagement of said pawl from said wheel for activating said scan motor, said starting pulse having a duration shorter than the time required to drive said rotatable means through the distance from one notch to the next on said wheel, and means biasing said pawl to engage the next succeeding notch when the same comes into registration with the pawl and to operate said last stated switch means to stop said scan motor.

9. The system set forth in claim 8 including a manually pressible load control switch, an overcenter reversing switch for said scan motor operable by said card holder as the same reaches its end limits of travel, and circuit means activatable by pressing said load control switch when said reversing switch is positioned to drive said card holder into a load position for maintaining said centralizing electromagnet continuously energized to cause said card holder to be driven continuously by said scan motor until the card holder reaches said load position.

10. A system for recording and reproducing binary coded pulses used for operating an electric typewriter comprising a record-reproduce machine, means for conditioning said machine selectively for recording and reproducing, said typewriter having an intermediate stop switch and means for operating said switch when a respective code signal is received, and means connecting said intermediate stop switch to said record-reproduce machine to stop said machine when said intermediate stop switch is operated including switch means controlled by said conditioning means for placing said connecting means in operable condition only when said record-reproduce machine is conditioned for reproducing.

11. A system for recording and reproducing binary coded pulses for operating an electric typewriter including a record-reproduce machine having a head and means for driving the head back and forth along successive tracks on a record medium, means including a start control operable to cause said machine to run continuously, a manually pressible stop control, and means including an end switch operable by said head when the same reaches a home position in its travel for stopping said machine responsive to pressing said stop control when said head next reaches said home position.

12. The system set forth in claim 11 including an absolute end relay, means for operating said relay responsive to pressing said stop control, a hold circuit for said end relay energized by operation of the relay, a motor stop relay, and circuit means including said end switch and switch means operable by said end relay for operating said motor stop relay responsive to pressing said stop control and upon said head next being moved into home position to operate said end switch.

13. The system set forth in claim 12 including an intermediate stop switch connected to said motor stop relay to operate the same the instant said intermediate stop switch is closed, including a normally closed start switch in the hold circuit of said motor stop relay for dropping out said relay and starting said machine when the start switch is opened.

14. In a system for recording and reproducing on and from a card form of record medium: the combination of a holder for a card record, means mounting said holder for movement in directions parallel to one edge of a mounted card record, a record-reproduce head, means mounting said head for movement across a mounted card record in directions at right angles to the directions of movement of said holder, power operable drive means for shifting said holder, means controlled by the positioning of said head for rendering said drive means operable only when said head is in an end position of its travel, a cabinet having an opening through which said card holder projects when in a card loading position, a push button control for said power operable drive means, and means controlled by said push button control only when said head is in an end position and said card holder is in a projecting position for starting said drive means to move said card holder inwardly of said cabinet into a start position.

References Cited in the file of this patent

UNITED STATES PATENTS

| | | |
|---|---|---|
| 1,519,054 | Reynolds | Dec. 9, 1924 |
| 2,648,589 | Hickman | Aug. 11, 1953 |
| 2,986,725 | Dirks | May 30, 1961 |